United States Patent [19]

Daniels

[11] Patent Number: 4,868,273

[45] Date of Patent: Sep. 19, 1989

[54] AROMATIC POLYMER

[75] Inventor: James A. Daniels, Yarm, England

[73] Assignee: Imperial Chemical Industries PLC, London, England

[21] Appl. No.: 231,479

[22] Filed: Aug. 12, 1988

[30] Foreign Application Priority Data

Aug. 12, 1987 [GB] United Kingdom ............... 8719125

[51] Int. Cl.$^4$ .................. C08G 8/02; C08G 14/00
[52] U.S. Cl. .................... 528/173; 528/174; 528/125; 528/126
[58] Field of Search ............ 528/173, 174, 125, 126

[56] References Cited

U.S. PATENT DOCUMENTS 3,647,751 3/1972 Darsow ..................... 528/174

Primary Examiner—John Kight
Assistant Examiner—Marvin L. Moore
Attorney, Agent, or Firm—Cushman, Darby & Cushman

[57] ABSTRACT

A polymer essentially of ether linked repeating units

—PhCOPhPh—  I

—PhSO$_2$PhPhSO$_2$Ph— and  II

—Ar—  III where Ph is para-phenylene and Ar is a divalent aromatic group selected from phenylene and groups containing 2 to 6 phenylene radicals linked together by means of one or more links selected from the direct link, aliphatic substituted methylene, CO and SO$_2$, provided that such SO$_2$—linked unit is different from unit II, unit I being present at at least 60% molar, the mutual proportion of units II and III being in the range 55:45 to 45:55 and the molar proportion of any other units being at most 20% on the total units present, said polymer having an inherent viscosity of at least 0.6.

10 Claims, No Drawings

AROMATIC POLYMER

The present invention relates to aromatic polymers, composite materials based on such polymers and the production of such polymers.

In many commercially available polymers of this type, aromatic rings are linked together by atoms or groups such as oxygen (ether), sulphur, sulphone, ketone or alkylene. Those containing ether and sulphone, and optionally alkylene, linkages are generally amorphous with a high glass transition temperature, for example over 200° C., in some cases at least 250° C. However, being amorphous, they are vulnerable to attack by a range of solvents, including hydrocarbon liquids.

In contrast, polymers containing ether and ketone linkages are generally crystalline or crystallisable and, in crystalline form, are resistant to attack by many chemical environments. They generally have a high melting temperature, typically at least 300° C., possibly over 400° C. However, the glass transition temperature of many polymers of this type is typically below 200° C. and may be in the range 140° C. to 160° C. Since an appreciable proportion of their mechanical strength is lost at temperatures around the glass transition temperature, these polymers are not suitable for applications which require the retention of mechanical properties such as modulus at temperatures of 180° C. or higher. If the polymer structure is modified in an attempt to increase the glass transition temperature, any such increase is usually accompanied by an increase in the melting temperature. Since, to avoid degradation, the polymer processing temperature is preferably at most 450° C., especially up to 430° C., the melting temperature of the polymer is preferably below 420° C., more preferably below 400° C. Few polymers possess a glass transition temperature of 180° C. or above together with a melting temperature below 420° C.

In the ensuing description the following abbreviations will be used:

DSC—differential scanning calorimetry;
Tm—melting point, the temperature at which the melting endotherm is observed;
Tc—temperature at which crystallisation occurs on cooling the melt before or after solidification.
Tg—glass transition temperature
IV—inherent viscosity, as measured at 30° C. on a solution of 0.1 g of polymer in 100 cm³ of solution in sulphuric acid of density 1.84 g/cm³.
RV—reduced viscosity, as measured at 30° C. on a solution of 1.0 g of polymer in 100 cm³ of solution in sulphuric acid of density 1.84 g/cm³ (In the IV range 0.3 to 1.0, IV=0.78 RV).

The determination of Tg by DSC is carried out by examining a 20 mg sample of polymer in a Mettler TA 3000 DSC instrument, using heating and cooling rates of 20° C./minute under nitrogen. From the resulting cooling curve Tg is obtained as the intercept of two straight lines drawn as tangents at the break in the cooling curve.

According to the invention a polymer consists essentially of ether linked repeating units —PhCOPhPh—     I —PhSO$_2$PhPhSO$_2$Ph and     II —Ar—     III where Ph is para-phenylene and Ar is a divalent aromatic group selected from phenylene and groups containing 2 to 6 phenylene radicals linked together by one or more links selected from the direct link, aliphatic substituted methylene, CO and SO$_2$, provided that such SO$_2$-linked unit is different from unit II unit I being present to the extent of at least 60% molar, the mutual proportion of units II and III being in the range 55:45 to 45:55 and the molar proportions of any other ether-linked units being at most 20% molar on the total units present, said polymer having an inherent viscosity of at least 0.6. Particular examples of units Ar are:

PhSO$_2$Ph
PhPh
PhPhPh
PhPhCOPhCOPhPh

A preferred polymer has IV not more than 2.5, particularly not more than 2.0, and preferably not more than 1.5. For ease of processing, IV is in the range 0.6 to 0.7, and this may increase to at least 0.7 during processing.

The polymer preferably contains, relative to the total of units I, II and III, not more than 90, more preferably not more than 88, mole % of unit I; 80 to 85 mole % of unit I relative to the total of I, II and III is particularly preferred.

Preferred polymers are characterised by one or more of (i) being crystalline; (ii) being tough when formed into a film by compression moulding; (iii) being resistant to a wide range of solvents, in particular being, on immersion for 24 hours is methylene chloride (CH$_2$Cl$_2$) at 20° C., "essentially unaffected", that is, gaining not more than 10% by weight; and (iv) having a glass transition tempeature over 200° C. and a melting temperature below 400° C., particularly below 390° C. and especially below 380° C. Thus these polymers are particularly useful for applications which require resistance to solvents and to high temperatures.

The polymers can be melt processed into shaped articles, including films and insulating coatings on electrical conductors. They can be used in applications for which polyethersulphones and/or polyaryletherketones have been proposed previously. In particular they may be used for bearings or bearings or bearing liners or for those applications which require a combination of one or more of good electrical insulating properties, good resistance to a wide range of chemicals, retention of mechanical properties up to high temperature, good resitance to burning and the emission of low proportions of toxic fumes and with low smoke density on burning.

Whilst for many applications the polymers may be used with few if any additives, other than stabilisers, at least one additive may be incorporated to produce a range of polymer compositions.

The at least one additive may be any previously proposed for polyarylethers containing sulphone and/or ketone linkages, for example inorganic and organic fibrous fillers such as of glass, carbon or poly-paraphenylene terephthalamide; organic and inorganic fillers such polytetrafluoroethylene, graphite, boron nitride, mica, talc and vermiculite; nucleating agents; and stabilisers such as phosphates and combinations thereof.

Preferably the total proportion of additives is at least 0.1%, and at most 80%, especially at most 70%, by weight of the total composition. The composition can contain for example 5 to 30% by weight of boron nitride; or at least 20% by weight of short glass or carbon fibre; or 50 to 70%, especially about 60%, by volume of continuous glass or carbon fibre; or a mixture of a fluorine-containing polymer, graphite and an organic or inorganic fibrous filler and the total proportion of these additives is preferably 20 to 50% by weight of the total composition.

The composition may be made by mixing the polymer with the additives for example by particle or melt blending. More specifically the polymer in the form of dry powder or granules, can be mixed with the additives using a technique such as tumble blending or high speed mixing. The blend thus obtained may be extruded into a lace which is chopped to give granules. The granules can be formed for example by injection moulding or extrusion, into a shaped article.

Alternatively the composition may be film, foil or powder/granules of the polymer with or without particulate additives, laminated with a fibrous filler in the form of mates or cloths.

Alternatively a composition containing fibrous filler may be obtained by passing essentially continuous fibre, for example glass or carbon fibre, through molten polymer or a mixture containing it. The product obtained is a fibre coated with polymer and the coated fibre may be used alone, or together with other materials, for example a further quantity of the polymer, to form a shaped article. The production of compositions by this technique is described in more detail in EP-A Nos. 56703, 102158 and 102159.

In the production of shaped articles from the polymers of the invention, or from polymer compositions containing them, desirably the crystallinity of the polymer is developed as far as possible during the fabrication process, because in subsequent use an article which can continue to crystalline can suffer dimensional changes, warping or cracking and general change in physical properties. Furthermore, increased crystallinity results in improved environmental resistance. The crystallinity of polymers of the invention is more than usually responsive to annealing after shaping. A process for making a shaped article at a crystallinity of less than 10% followed by annealing to a crystallinity greater than 15% constitutes a further feature of the invention. The annealing step is at a temperature 50°–100° especially 60°–80° C. less than the temperature of the highest melting endotherm of the polymer; typically it is at 280°–320° C.

In another method of achieving improved crystallisation behaviour, the polymer may be modified by forming terminal ionic groups —A—X, where A is an anion and X is a metal cation. The production of such modified polymers is described in more detail in our EP-A No. 152161.

The anion is preferably selected from sulphonate, carboxylate, sulphinate, phosphonate, phosphate, phenate and thiophenate and the metal cation is an alkali metal or alkaline earth metal.

By such modifications the crystallisation temperature Tc may be raised by at least 2° C. in comparison with a similar polymer not containing the ionic end-groups. However, useful polymers are obtained even when there is little or no change in Tc if sufficient nucleation results from the presence of end groups to increase the number of spherulites in comparison with a similar composition not containing the ionic end groups.

Such modified polymers are most suitably produced by reaction of a preformed polymer with reactive species containing the ionic group. Typically a polymer which already contains an end group which can be displaced by a nucleophilic reagent is reacted with a species containing a reactive nucleophilic group and the group —A—X. For example, if the polymer has a terminal group selected from fluoro, chloro and nitro the reactive species contains a nucleophilic group such as a phenate or thiophenate or a group of formula —A—X.

Alternatively the preformed polymer may contain a terminal nucleophilic group and the ionic ended polymer may be formed by reaction of this group with a low molecular weight compound carrying a group which can be displaced by a nucleophilic reagent, such as chloro, fluoro or nitro and —A—X. It will be appreciated that a polymer having a terminal nucleophilic group can be readily derived from a polymer carrying a terminal group displaceable by a nucleophilic reagent. For example a fluorine ended polymer can be reacted with the low molecular weight compound carrying a fluoro, chloro or nitro group and —A—X in the presence of a base which will replace the fluorine end group to give a nucleophilic end group.

In a further procedure a polymer, regardless of the nature of its end-groups, preferably of high number average molecular weight, for example greater than about 10,000, is melted in the presence of a species having a nucleophilic group and a —A—X group under conditions which cause scission of the polymer chain. The conditions which cause scission are enhanced if the reaction is done at high temperature or in the environment of a solution rather than a melt but are primarily affected by the nature of the polymer chain. Whilst it is preferred to use polymers of high molecular weight so that the product of chain scission still has useful properites, we have found that low molecular weight products containing the terminal ionic groups are useful since they can influence the crystallisation behaviour of high molecular weight polymers which do not contain terminal ionic groups.

Modified polymers containing terminal ionic groups may be used alone or in a blend with unmodified polymers to form shaped articles. Such modified polymer or blend may also be used with one or more additives as hereinbefore described.

According to a process aspect of the invention a process for the preparation of a polymer comprises polycondensing, under substantially anhydrous conditions, at least one compound

with at least one compound

and at least one compound

and/or with a polyarylethersulphone having repeating units

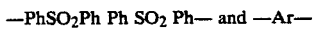

in which polyarylethersulphone the repeating units are linked by ether linkages where Ph is para-phenylene and $Y^1$, $Y^2$, and, when present, $Y^3$ to $Y^6$ are independently halogen or —OH and are such that halogen and —OH are in substantially equimolar amounts, in the presence of at least one alkali metal hydroxide, carbonate or bicarbonate in a stoichiometric amount or up to 25% excess with respect to the phenolic groups in the said compounds and the said repeat units of the polyarylethersulphone.

Typically $Y^1$ is halogen and $Y^2$ is —OH. In the said compounds $Y^3$ and $Y^4$ or $Y^5$ and $Y^6$ can respectively be halogen and OH if desired; alternatively essentially equimolar proportions of the bis-halide and the bis-phenol can be used.

The compound $Y^1$ PhCOPhPh$Y^2$ is preferably 4-(4-chlorobenzoyl)4'-hydroxybiphenyl or 4-(4-fluorobenzoyl)-4'-hydroxybiphenyl. In the compound $Y^3$PhSO$_2$PhPhSO$_2$Ph$Y^4$, $Y^3$ and $Y^4$ can be chlorine (or fluorine) and hydroxy respectively or a mixture of the dichloro (or difluoro) compound and the dihydroxy compound can be used. The compound $Y^5$—Ar—$Y^6$ can likewise be present a halogen-hydroxy compound or a mixture of dihalogeno and dihydroxy compounds. Examples of compounds $Y^5$—Ar—$Y^6$ are
4,4'-dihydroxy diphenyl sulphone
4,4'-dihydroxy biphenyl
1,4-bis 4-bromophenylbenzene
1,4-bis-4'-bromobiphenyloylbenzene
1,4-bis 4'-hydroxybiphenyloylbenzene If the polyarylethersulphone is used the magnitude of its RV and the nature of its chain end groups appear not to substantially affect the propeties of the polymer obtained.

In preparing the polymers, "substantially equimolar" amounts of halogen and —OH— includes a slight excess of either for example up to 5% mole, especially up to 2% mole; in particular, an excess of halogen may be used to obtain the most stable polymer. The molecular weight of the polymer obtained can be controlled by thus using excess halogen or —OH and, alternatively or additionally, by including in the reaction mixture a small proportion, for example less than 5% mole, and especially less than 2% mole relatively to the monomers and/or the polyarylethersulphone, of a monofunctional compound such as a phenol or, preferably, an activated arylmonohalide.

The polycondensation reaction may be carried out in the presence or absence of a solvent.

Preferably a solvent is employed and is an aliphatic or aromatic sulphoxide or sulphone of the formula

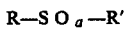

where
a is 1 or 2; and
R and R', which may be the same or different, are alkyl or aryl groups, and may together form a divalent radical.

Solvents of this type include dimethyl sulphoxide, dimethyl sulphone, and sulpholane (1,1-dioxothiolan) but the preferred solvents are aromatic sulphones of the formula

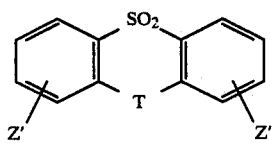

where

T is a direct link, oxygen or two hydrogens (one attached to each benzene ring); and Z and Z', which may be the same or different, are hydrogen or alkyl, alkaryl, aralkyl or aryl groups.

Examples of such aromatic sulphones include diphenylsulphone, ditolylsulphone, dibenzothiophen dioxide, phenoxathin dioxide and 4-phenylsulphonyl biphenyl. Diphenylsulphone is preferred. Other solvents that may be used include N,N-dimethyl formamide and N-methyl-2-pyrrolidone.

In the polycondensation reaction mixture, if an alkali metal hydroxide is used, this is preferably pre-reacted with the halophenol and any disphenol. The resulting phenate should preferably be in a finely divided form, for example having a particle size of less than 1.0 preferably less than 0.5 mm. The phenate is conveniently formed in aqueous or methanolic solution and, since the polycondensation should be effected in the essential absence of —OH containing compounds such as water and alcohols, it is necessary to remove such compounds prior to effecting the polycondensation. Thus the halophenol or bisphenol may be stirred in a solution of alkali metal hydroxide in water or a 90:10 by volume mixture of methanol and water, preferably in the ratio of 1 mole of phenol groups to at least one mole of hydroxide, until it has dissolved; then the solvent may be evaporated off, for example by spray drying. Any hydrated phenate obtained is preferably dehydrated for example by evaporation under reduced pressure, or by heating, preferably in the presence of a diaryl sulphone, at above 150° C., preferably above 200° C. and preferably under partial vacuum, e.g. 25 to 400 torr. A particular advantage in dehydration of the phenate in the presence of a diaryl sulphone in the polycondensation vessel is that, because the diaryl sulphone does not boil, there is no splashing of the phenate on the walls of the reaction vessel and hence stoichiometry of the polycondensation reaction is maintained. Any dihalo-benzenoid monomers to be used in the polycondensation can be added after evolution of water has ceased, for example as indicated by cessation of foaming. After removal of the water, and addition of any necessary dihalo-benzenoid monomers and/or additional base, the temperature is increased to the polycondensation temperature.

If the base is an alkali metal carbonate added as such or as bicarbonate, whether for the whole base requirement or as an addition to the phenate, it is preferably anhydrous. However, if hydrated it may be dehydrated during heating up to the polycondensation temperature if that temperature is high enough.

The base is desirably used in a finely divided form since we have found that with coarse materials the product obtained may have a lower IV. For example using sodium carbonate as particles all below 0.261 mm (as determined using a Malvern 3300 Laser Particle Sizer), a polymer product of IV over 0.7 was obtained, whereas with (at least 50% by weight of the particles over 0.376 mm the IV was less than 0.7.

In order to achieve a satisfactory molecular weight the alkali metal hydroxide, carbonate or bicarbonate should be used preferably in excess over the stoichiometric proportion, the excess being particularly in the range 1 to 15%, for example 6%, molar.

It is preferred to use an alkali metal bicarbonate, especially sodium bicarbonate. Where polycondensation in presence of bicarbonate is mentioned, it will be appreciated that the alkali is introduced into the reaction mixture as bicarbonate which decomposes to carbonate before polycondensation temperature is reached. Carbonate derived in situ from bicarbonate appears to be in a highly suitable physical form.

In the process of the invention if either of Y' to $Y^4$ is chlorine or bromine, the polycondensation may with advantage be carried out in the presence of a copper containing catalyst.

The copper is preferably not more than 1%, preferably less than 0.4%, but desirably at least 0.01%, molar with respect to the monomers. A wide range of materials may be used, cupric and cuprous compounds and also metallic copper and suitable alloys being useable to introduce the copper containing catalyst. Preferred copper compounds are essentially anhydrous and include cuprous chloride, cupric chloride, cupric acetylacetonate, cuprous acetate, cupric oxide, cupric hydroxide, basic carbonate or basic chloride (these three dehydrated in situ) and particularly cuprous oxide. This procedure is described in more detail in our EP-A Nos. 182648 and 232019. The stoichiometric excess of the alkali metal hydroxide, carbonate or bicarbonate is calculated after allowing for reaction with the copper compound if it is a salt of a strong acid and disregards any basicity of the copper compound.

If the polycondensation is effected in the presence of a copper containing catalyst, removal of copper residues from the polymer at the completion of the polymerisation is very desirable. Especially if the polymer has been efficiently end-capped, for example with 4,4'-dichlorodiphenylsulphone, the residues may be removed using a complexing agent such as ethylenediamine tetraacetic acid and thereafter washing the polymer with water or a mixture of water and methanol.

The polycondensation reaction is carried out at least 150° C., preferably in the range 250° C. to 400° C., particularly 280° C. to 350° C. An increase in reaction temperatures leads to shorter reaction times but with risk of product decomposition and/or side reactions. However a temperature should be used which maintains the polymer in solution. In general the solubility of polymer in the polycondensation solvent, for example a diaryl sulphone, increases with temperature. Solubility also increases with increasing proportion of sulphone groups in the polymer chain, hence polymers having a higher proportion of sulphone groups can, if desired, be produced at slightly lower polymerisation temperatures.

In order to obtain products of improved properties, it may be advantageous to use a prepolycondensation stage in which the monomers are heated together at a temperature at which some oligocondensation occurs but little, if any, polycondensation occurs. Such prepolycondensation can be effected at 200° C. to 250° C., particularly 220° C. to 245° C. The prepolycondensation is believed to result in the formation of relatively involatile oligomers and hence to reduce the possibility of volatile monomers being removed from the reaction mixture.

The polycondensation is preferably carried out in an inert atmosphere, for example argon or nitrogen. The reaction vessel can be made from glass but for operation on a large scale is preferably made from stainless steels (other than those which undergo surface crazing at the reaction temperatures in the presence of alkali metal halide), or made of, or lined with, titanium, nickel or an alloy thereof or some similarly inert material.

To neutralise any reactive oxygen-containing anions, a reagent therefor may be introduced into the polycondensation reaction. Reactive monofunctional halides, for example methyl chloride, and reactive aromatic halides such as, for example, 4,4'-dichlorodiphenylsulphone, 4,4'-dichloro-benzophenone, 4-chlorodiphenylsulphone or 4-chloro-benzophenone are particularly suitable.

At the completion of polycondensation, the reaction mixture may be (i) allowed to cool and, depending on the polycondensation solvent, to solidify, (ii) ground, (iii) treated to remove any polymerisation solvent, for example by extraction with a solvent therefor, conveniently a mixture of acetone or an alcohol for example methanol, with water, and finally (iv) dried. Additionally, the polymer may be treated to remove any copper residues.

The polycondensation can be carried out in a first stage at such a temperature in the range 150°–400° C. for such a time and with such molecular weight control by non-stoichiometric reactants that an intermediate polymer of low or moderate molecular weight is produced and thereafter in one or more subsequent stages in which the molecular weight is increased to a desired level.

In one form of this process the molecular weight of the intermediate polymer corresponds to an IV in the range 0.4 to 0.6 and is increased to a level corresponding to an IV of at least 0.7. In a second form of the process the molecular weight of the intermediate polymer corresponds to an IV in the range 0.3 to 0.5 and is increased to a level over 0.6, especially over 0.7.

More specifically, the molecular weight of the intermediate polymer is increased by providing a mixture of (1) at least one such intermediate polymer having end groups selected from groups of formula

—Ar—$X^1$ and —Ar—OD where Ar is arylene, preferably phenylene; $X^1$ is a monovalent radical capable of nucleophilic displacement from Ar, preferably selected from halogen, nitrile (CN) or nitro ($NO_2$) radicals; and D is a univalent metal and (2) a reagent having nucleophilic activity selected from (a) alkaline salts of Group I and Group II metals and (b) reagents having radicals —$X^1$ and —OD, reactive respectively with the end groups —Ar—OD and —Ar—$X^1$, wherein (i) when the end group is —Ar—$X^1$ the reagent is difunctional having either both end groups —OD or one —OD group and one —$X^1$ group; and (ii) when the end group is —Ar—OD the reagent is difunctional having both end groups —$X^1$, and heating the mixture to a temperature above the melting point of the polymer until a desired increase in molecular weight has occurred. This procedure is described in more detail in EP-A No. 125816. Particularly it can be used in the production of composites or in powder coating or rotational moulding.

When the toughness of the polymers is to be determined, the test used consists in compression-moulding a film about 0.2 mm thick from a sample of the polymer at a temperature at least 40° C. above the polymer melting point in a press (4400 $MN/m^2$ for 5 minutes), then either cooling the film slowly in induce complete crystallisation or else quench cooling and annealing it to induce the requisite crystallisation. The film is flexed through 180° to form a crease, whereby the two faces of the film formed about the crease touch. The film is compressed manually to form the crease line. If the film survives this treatment without breaking (eg snapping or tearing) it is deemed to be tough; if it fails on the formation of the crease, it is deemed to be brittle and if it fails during the test it is regarded as moderately tough.

The invention is illustrated by the following examples, in which "PAES" represents a polyarylethersulphone consisting of ether-linked equal molar proportions of unit II hereinabove and —Ar—, where Ar is PhSO$_2$—Ph.

EXAMPLE 1

5.55 g (1.79×10$^{-2}$ mole) of 4-(4-chlorobenzoyl)-4'-hydroxy biphenyl (89.1 mol %), 1.36 g of PAES (10.9 mol %), 0.1 g (0.037×10$^{-2}$ mole) of 4,4'-dichlorodiphenylsulphone, 1.78 g (2.12×10$^2$ mole) of sodium bicarbonate and 25.0 g of diphenylsulphone were charged to a 100 cm$^3$ glass reaction tube equipped with a stirrer, nitrogen inlet and an air condenser. The tube was purged with nitrogen and its contents were thoroughly mixed.

The tube and its contents were heated to 200° C., maintained there for 30 min, heated to 320° C. and maintained there for 2½ h, under nitrogen with constant stirring, then the melt was cooled to give a fawn coloured "toffee".

The "toffee" was broken into pieces and ground in a hammer mill containing a 1.0 mm sieve screen. The resulting powder was extracted in a soxhlet apparatus with acetone for one hour to remove diphenyl sulphone, then with water by refluxing for 2×30 min to remove sodium chloride, then finally refluxed with methanol for 30 min to remove any traces of unreacted monomers. The remaining solid was dried at 130° C. and pressure of 40 KN/m$^2$ for 16 h.

The product, a creamy-white polymer, was obtained in greater than 96% yield. Its IV at 30° C. was 0.82. DSC study showed Tm 388° C. Tg 213° C. and Tc 295° C.

The powdered polymer moulded at 420° C. for 3 min with a pressure of 4400 MN/m$^2$ then slowly cooled gave a tough opaque straw coloured film.

Samples of film immersed in methylene chloride (CH$_2$Cl$_2$) at 20° C. for 24 h showed a weight increase 4.7%. No visible effect of attack by methylene chloride was evident and the film remained tough.

EXAMPLES 2-5

A series of copolymers, incorporating differing proportions of 4-(4-chlorobenzoyl)-4'-hydroxybiphenyl (A) and PAES were prepared by the procedure of Example 1. Table 1 lists the molar amounts of 'monomers' used along with the amount of sodium bicarbonate. 4,4'-dichloro-diphenylsulphone was also added at 1.7 mol % based on monomers charged:

TABLE 1

| Example | Mole of A | Mole % A | Mole of B | Mole % B | Mole of NaHCO$_3$ |
|---|---|---|---|---|---|
| 2 | 1.76 × 10$^2$ | 86.9 | 0.265 × 10$^{-2}$ | 13.1 | 2.12 × 10$^{-2}$ |
| 3 | 1.69 × 10$^{-2}$ | 83.6 | 0.331 × 10$^{-2}$ | 16.4 | 2.12 × 10$^{-2}$ |
| 4 | 1.60 × 10$^{-2}$ | 78.4 | 0.442 × 10$^{-2}$ | 21.6 | 2.12 × 10$^{-2}$ |
| 5 | 1.52 × 10$^{10-2}$ | 74.2 | 0.529 × 10$^{-2}$ | 25.8 | 2.12 × 10$^{-2}$ |

Table 2 shows thermal properties, film characteristics and solvent uptake.

TABLE 2

| Ex | IV | DSC Data Tm | Tg | Film | CH$_2$Cl$_2$ Uptake (24 h Immersion) wt % increase |
|---|---|---|---|---|---|
| 2 | 0.72 | 375–385 | 214 | opaque/tough | 10.4 |
| 3 | 0.89 | — | 219 | clear/tough | 52.7 |
| 4 | 0.88 | — | 225 | clear/tough | 67.3 |
| 5 | 0.71 | — | 227 | clear/tough | 82.6 |

EXAMPLES 6-7

The procedure described in Example 1 and the amounts of reactants used in Example 3 were repeated but the reaction times were varied. Table 3 shows the reaction times and the thermal properties, film characteristics and solvent uptake of the resulting polymers.

TABLE 3

| Ex | Reaction Time | IV | DSC Data Tm | Tg | Film | CH$_2$Cl$_2$ Uptake (24 h Immersion) wt % increase |
|---|---|---|---|---|---|---|
| 6 | 1¾ h | 0.70 | — | 214 | slight opaqueness/tough | 36.9 |
| 7 | 1½ h | 0.64 | 370 | 212 | opaque/moderately tough | 33.7 |

To further enhance the crystallinity levels in the copolymers, samples of the polymers prepared as in Example 7 were annealed in a DSC instrument and in a high temperature compression moulding press for various time periods.

The annealed samples for DSC were first melted by heating the polymer to 400° C., cooled, then held at 300° C. for various times (see Table 4) before cooling to room temperature. The polymer samples were then heated to 400° C. at 20° C./min.

The annealed samples were prepared by melting powdered polymer for 3 min at 400° C. in the high temperature compression moulding press, cooled then held at 300° C. for various times corresponding to those used in the DSC experiment.

The results are shown in Table 4.

TABLE 4

| Annealing Time min | DSC Data Tm | Tg | % Cryst | Film | CH$_2$Cl$_2$ Uptake (24 h Immersion) wt % increase |
|---|---|---|---|---|---|
|  | 370 | 212 | 1.4 | opaque/moderately tough | 33.7 |
| 20 | 313 + 365 | 216 | 9.1 | opaque/moderately tough | 21.2 |
| 40 | 317 + 364 | 217 | 14.3 | opaque/brittle | 16.1 |
| 60 | 319 + 363 | 217 | 16.2 | opaque/brittle | 12.2 |

EXAMPLE 8

The procedure described in Example 1 was repeated using the following formulation and reaction conditions; 5.24 g ($1.70 \times 10^{-2}$ mole) of 4-(4-chlorobenzoyl)-4-hydroxybiphenyl, (85.0 mole %), 1.84 g of PAES (15 mole %), 0.12 g ($0.042 \times 10^{-2}$ mole) of 4,4-dichlorodiphenylsulphone, 1.78 g ($2.12 \times 10^{-2}$ mole) of sodium bicarbonate and 25.0 g of diphenyl sulphone were charged to a reactor tube. The reaction time was 1 h 10 min at 320° C.

A creamy-white polymer was obtained in greater than 96% yield. Its IV was 0.67. DSC study was carried out on the polymer (i) as mode and ii) after annealing for various times at 300° C. The results are shown in Table 5.

TABLE 5

| Annealing Time min | DSC Data | | | Film | $CH_2Cl_2$ Uptake (24 h Immersion) wt % increase |
|---|---|---|---|---|---|
| | Tm | Tg | % Cryst | | |
| — | 415 − 375 | 212 | 4.0 | opaque/moderately tough | 28.3 |
| 60 | 318 + 365 | 216 | 15.4 | opaque/moderately tough | 10.5 |
| 120 | 322 + 363 | 220 | 15.7 | opaque/moderatley tough | 10.4 |

EXAMPLE 9

5.50 g ($1.78 \times 10^{-2}$ mole) of 4-(4-chlorobenzoyl)-4'-hydroxy biphenyl (81.1 mol %), 0.55 g ($0.11 \times 10^{-2}$ mole) of 4,4'-(4-chlorophenylsulphonyl)biphenyl (5.45 mole %), 0.27 g ($0.11 \times 10^{-2}$ mole) of 4,4'-dihydroxydiphenylsulphone (5.45 mole %), 1.78 g ($2.12 \times 10^{-2}$ mole) of sodium bicarbonate and 25.0 g of diphenyl sulphone were reacted as in Example 1 for 2 1/2 h at 320° C.

A creamy-white polymer ws obtained in 95% yield. Its IV was 0.75.

A DSC study showed Tm 390° C., Tg 211° C. and Tc 298° C.

The polymer had a close resemblance to material prepared in Example 1 using 89.9 mole % 4-(4-chlorobenzoyl)-4-hydroxybiphenyl and 10.1 mole % PAES instead of the monomers thereof.

EXAMPLE 10

4.32 g ($1.40 \times 10^{-2}$ mole) of 4-(4-chlorobenzoyl)-4'-hydroxy biphenyl (70.0 mol %), 1.53 g ($0.30 \times 10^{-2}$ mole) of 4,4'-(4-chlorophenylsulphonyl)biphenyl (15.0 mole %), 0.56 g ($0.30 \times 10^{-2}$ mole) of 4,4'-dihydroxybiphenyl) (15.0 mole %), 1.78 g ($2.12 \times 10^{-2}$ mole) of sodium bicarbonate and 30.0 g of diphenyl sulphone were reacted as in Example 1 for 4 h at 300° C.

A creamy white polymer was obtained in greater than 95% yield. Its IV was 0.67.

A DSC study showed Tm 404° C., Tg 220° C. and crystallinity (as measured from the melt endotherm) 19.8%.

The powdered polymer was moulded at 430° C. for 3 min with a pressure for 4400 $MN/m^2$ then slowly cooled to give an opaque, brittle straw coloured film. The polymer was annealed in a DSC instrument for 1 h at 300° C. as described in Examples 6–7. On reheating from 80° C. to 450° C. the polymer showed two melt endotherms, a large one at 401° C. and a smaller one at 328° C. Tg had increased to 222° C. and crystallinity to 24.9%.

EXAMPLE 11-14

A series of copolymers, incorporating differing proportions of 4-(4-chlorobenzoyl)-4'-hydroxybiphenyl (A), 4,4'-(4-chlorophenylsulphonyl)biphenyl (B) and 4,4'-dihydroxybiphenyl (C), were prepared by the procedure of Example 10. Table 6 lists the molar amounts of monomers used. The amount of sodium bicarbonate used was constant at $2.12 \times 10^{-2}$ mole.

TABLE 6

| Example | Mole of A | Mole % A | Mole of B | Mole % B | Mole of C | Mole % C | Reaction Temp °C. | Conditions Time h |
|---|---|---|---|---|---|---|---|---|
| 11 | $1.70 \times 10^{-2}$ | 85.0 | $0.15 \times 10^{-2}$ | 7.5 | $0.15 \times 10^{-2}$ | 7.5 | 330 | 2.0 |
| 12 | $1.20 \times 10^{-2}$ | 60.0 | $0.40 \times 10^{-2}$ | 20.0 | $0.40 \times 10^{-2}$ | 20.0 | 320 | 3.5 |
| 13 | $1.00 \times 10^{-2}$ | 50.0 | $0.50 \times 10^{-2}$ | 25.0 | $0.50 \times 10^{-2}$ | 25.0 | 320 | 2.5 |
| 14 | $0.80 \times 10^{-2}$ | 40.0 | $0.60 \times 10^{-2}$ | 30.0 | $0.60 \times 10^{-2}$ | 30.0 | 330 | 3.0 |

Table 7 shows their solution viscosity and thermal properties.

TABLE 7

| Example | IV | DSC Thermal Data | | |
|---|---|---|---|---|
| | | Tm | Tg | % Cryst |
| 11 | 0.51 | 437 | 202 | 37.8 |
| 12 | 0.57 | 386 | 222 | 10.3 |
| 13 | 0.57 | — | 227 | — |
| 14 | 0.48 | — | 232 | — |

The polymer obtained in Example 12 was annealed in a DSC instrument for 1 h at 300° C. as described in Examples 6–7. On reheating from 80° C. to 450° C. it showed two melt endotherms, 382° and 328° C., Tg 228° C. and crystallinity had increased to 20.4%.

EXAMPLE 15

The procedure described in Example 10 was repeated with the addition of 0.025 g ($0.017 \times 10^{-2}$ mole) of cuprous oxide. The reaction was carried out at 320° C. for 2 h. After treatment with acetone, but before treating with water and methanol, the powder was treated with a 0.05M aqueous solution of ethylene diamine tetracetic acid (EDTA) to remove copper residues. The treatment with EDTA was by stirring twice with 200 $cm^3$ of the solution at ambient temperature (20° C.) for 30 min, then at 60° C. for 30 min. The powder was then treated with water and methanol as in Example 1.

The creamy-white polymer was obtained in greater than 95% yield. Its IV was 0.85.

DSC study showed Tm 395° C., Tg 215° C. and % crystallinity 16.6%.

The powdered polymer was moulded at 430° C. for 3 min with a pressure of 4400 MN/m$^2$ then slowly cooled to give an opaque, tough straw coloured film.

The polymer was annealed in a DSC instrument for 2 h at 300° C. as described in Examples 6–7. On reheating from 80° C. to 450° C. it showed melt endotherms at 395° C. and 325° C., Tg 227° C. and crystallinity of 22.7%.

at 400° C. and 322° C., Tg 231° C. and crystallinity 26.8%.

The powdered polymer was moulded at 430° C. for 3 minutes with a pressure of 4400 MN/m$^2$ then slowly cooled to give an opaque, moderately tough film.

EXAMPLES 20–21

Two further copolymers were prepared incorporating different proportions of 4-(4-fluorobenzoyl)-4'-hydroxybiphenyl (A), 4,4'-(4-chlorophenylsulphenyl)-biphenyl (B) and 4,4'-dihydroxybiphenyl (C) by the procedure described in Example 19. Table 9 lists the molar amounts of monomers used. The amount of sodium bicarbonate remained constant at $2.12 \times 10^{-2}$ mole.

TABLE 10

| Example | Mole of A | Mole % A | Mole of B | Mole % B | Mole of C | Mole % C | Reaction Temp °C. | Conditions Time h |
|---|---|---|---|---|---|---|---|---|
| 20 | $1.2 \times 10^{-2}$ | 60 | $0.4 \times 10^{-2}$ | 20 | $0.4 \times 10^{-2}$ | 20 | 340 | 4 |
| 21 | $1.0 \times 10^{-2}$ | 50 | $0.5 \times 10^{-2}$ | 25 | $0.5 \times 10^{-2}$ | 25 | 340 | 4 |

EXAMPLES 16–18

The procedure of adding cuprous oxide as described in Example 15 was repeated with other combinations of the monomers 4-4-chlorobenzoyl)-4'-hydroxybiphenyl (A), 4,4'-(4-chlorophenylsulphonyl)biphenyl (B) and 4,4'-dihydroxy biphenyl (C). Table 8 lists the molar amounts of monomers used. The amount of sodium bicarbonate used for Ex 18 was $2.12 \times 10^{-2}$ mole and the amount of cuprous oxide $0.017 \times 10^{-2}$ mole. Ex 16–17 used $4.14 \times 10^{-2}$ mole sodium bicarbonate and $0.034 \times 10^2$ mole cuprous oxide.

Table 11 shows IV values and thermal properties.

TABLE 11

| Example | IV | DSC Thermal Data | | |
|---|---|---|---|---|
| | | Tm | Tg | % Cryst |
| 20 | 0.89 | 395 | 231 | 15.9 |
| 21 | 0.78 | — | 238 | — |

The polymer from Example 20 was annealed for 2 h at various temperatures to obtain the optimum conditions for Tg and % crystallinity. The results are noted in Table 12.

TABLE 6

| Example | Mole of A | Mole % A | Mole of B | Mole % B | Mole of C | Mole % C | Reaction Temp °C. | Conditions Time h |
|---|---|---|---|---|---|---|---|---|
| 16 | $2.72 \times 10^{-2}$ | 68.0 | $0.64 \times 10^{-2}$ | 16.0 | $0.64 \times 10^{-2}$ | 16.0 | 325 | 3.0 |
| 17 | $2.60 \times 10^{-2}$ | 65.0 | $0.70 \times 10^{-2}$ | 17.5 | $0.70 \times 10^{-2}$ | 17.5 | 320 | 2.5 |
| 18 | $1.20 \times 10^{-2}$ | 60.0 | $0.40 \times 10^{-2}$ | 20.0 | $0.40 \times 10^{-2}$ | 20.0 | 320 | 2.0 |

Table 9 shows IV values and thermal properties (before and after annealing at 300° C. for 2 h).

TABLE 9

| Example | IV | DSC Thermal Data | | | | | |
|---|---|---|---|---|---|---|---|
| | | Before annealing | | | Annealing 2 h/300° C. | | |
| | | Tm | Tg | % Cryst | Tm | Tg | % Cryst |
| 16 | 0.74 | 398 | 221 | 15.0 | 394 + 324 | 225 | 23.8 |
| 17 | 0.76 | 385 | 220 | 11.4 | 379 + 320 | 225 | 20.6 |
| 18 | 0.91 | — | 222 | — | 370 + 322 | 232 | 12.4 |

EXAMPLE 19

3.80 g ($1.30 \times 10^{-2}$ mole) of 4-(4-fluorobenzoyl)-4'-hydroxy biphenyl (65.0 mole %), 1.76 g ($0.35 \times 10^{-2}$ mole) (4,4'-(4-chlorophenylsulphonyl (biphenyl (17.5 mole %), 0.65 g ($0.35 \times 10^{-2}$ mole) of 4,4'-dihydroxybiphenyl (17.5 mole %), 1.78 g ($2.12 \times 10^{-2}$ mole) of sodium bicarbonate and 25.0 g of biphenyl sulphone were charged to a glass reactor as described in Example 1. The reaction time was 3 h at 325° C.

The creamy-white polymer was obtained in greater than 95% yield. Its IV was 0.64.

DSC study showed Tm 410° C., Tg 226° C. and crystallinity 19.8%. The polymer was annealed for 2 h at 300° C. as described in Examples 6–7. On reheating from 80° C. to 450° C. it showed two melt endotherms

TABLE 12

| Annealing Temp | Example 20 | | | |
|---|---|---|---|---|
| | Tm | DSC Data | | |
| | | Tg | % Cryst | |
| — | 395 | 231 | 15.9 | |
| 280 | 390 + 305 | 236 | 9.0 | |
| 300 | 393 + 322 | 238 | 16.9 | |
| 320 | 392 + 345 | 237 | 18.9 | |

The polymer from Example 21 was annealed for 2 h at 300° C. as described in Example 6–7. On reheating from 80° C. to 450° C. it showed melt endotherms at 374° C. and 325° C., Tg at 241° C. and crystallinity had increased to 10.3%.

EXAMPLE 22

4.32 g ($1.40 \times 10^2$ mole) of 4-(4-chlorobenzoyl)-4'-hydroxybiphenyl (70.0 mole %), 1.40 g ($0.30 \times 10^{-2}$ mole) of 4,4'-(4-hydroxyphenylsulphonyl/biphenyl (15.0 mol %), 1.16 g ($0.30 \times 10^{-2}$ mole) of 1,4 bis 4-bromophenylbenzene (15.0 mol %), 1.78 g ($2.12 \times 10^{-2}$ mole) of sodium bicarbonate, 0.025 g ($0.07 \times 10^{-2}$ mole) of cuprous oxide and 25.0 g of diphenyl sulphone were reacted as described in Example 1 for 2½ h at 330° C.

A creamy-white polymer was obtained in greater than 95% yeild. Its IV was 0.81.

A DSC study showed Tm 375° C., Tg 211° C. and crystallinity 3.5%. The polymer was annealed for 2 h at 300° C. as described in Examples 6–7. On reheating from 80° C. to 450° C. it showed melt endotherms at 367° C. and 325° C., Tg 218° C. and crystallinity 14.8%.

EXAMPLE 23

4.32 g ($1.40 \times 10^{-2}$ mole) of 4-(4-chlorobenzoyl)-4'-hydroxybiphenyl (70.0 mol %), 1.40 g ($0.30 \times 10^{-2}$ mole) of 4,4'-(4-hydroxyphenylsulphonyl)biphenyl (15.0 mole %), 1.82 g ($0.30 \times 10^{-2}$ mole) of 1,4 bis 4'-bromobiphenyloylbenzene (15.0 mol%), 1.78 g ($2.12 \times 10^{-2}$ mole) of sodium bicarbonate, 0.025 g ($0.017 \times 10^{-2}$ mole) of cuprous oxide and 25.0 g of diphenyl sulphone were charged to a glass reactor as described in Example 1. The reaction time was 2½ h at 330° C.

A creamy-white polymer was obtained 92.3% yield. It IV was 0.55.

DSC study showed Tm 382° C., Tg at 210° C. and crystallinity 13.7%. The polymer was annealed for 2 h at 300° C. as described in Examples 6–7. On reheating from 80° C. to 450° C. it showed melt endotherms at 379° C. and 320° C., Tg 218° C. and crystallinity 25.7%.

EXAMPLE 24

4.32 g ($1.40 \times 10^{-2}$ mole) of 4-(4-chlorobenzoyl)-4'-hydroxybiphenyl (70.0 mol %), 1.51 g ($0.30 \times 10^{-2}$ mole) of 4,4'-(4-chlorophenylsulphonyl)biphenyl (15.0 mol %), 1.30 g ($0.30 \times 10^{-2}$ mole) of 1,4-bis(4(4-hydroxyphenyl)-benzoyl)benzene (15.0 mole %), 1.78 g ($2.12 \times 10^{-2}$ mole) of sodium carbonate, 0.030 g ($0.021 \times 10^{-2}$ mole) of cuprous oxide and 30.0 g of diphenyl sulphone were charged to a glass reactor as described in Example 1. The reaction time was 3 h at 330° C.

A creamy white polymer was obtained in greater than 95.0% yield. Its IV was 0.79.

DSC study showed Tm 405° C., Tg 212° C. and crystallinity 18.9%. The polymer was annealed for 2 h at 300° C. as described in Examples 6–7. On reheating from 80° C. to 450° C. it showed melt endotherms at 410° C. and 320° C., Tg 221° C. and crystallinity 21.7%.

I claim:

1. A polymer consisting essentially of ether linked repeating units

—PhCOPhPh—    I

—PhSO$_2$PhPhSO$_2$Ph and    II

—Ar—    III where Ph is para-phenylene and Ar is a divalent aromatic group selected from phenylene and groups containing 2 to 6 phenylene radicals linked together by one or more links selected from the direct link, aliphatic substituted methylene, CO and SO$_2$, provided that such SO$_2$-linked unit is different from unit II, unit I being present at at least 60% molar, the mutual proportion of units II and III being in the range 55:45 to 45:55 and the molar proportion of any other units being at most 20% on the total units present, said polymer having an inherent viscosity of at least 0.6.

2. A polymer according in claim 1 containing up to 88% of unit I.

3. A polymer according to claim 1 in which Ar is selected from the class consisting of
PhSO$_2$Ph
PhPh
PhPhPh
PhPhCOPhCOPhPh.

4. A polymer according to claim 1 characterised by one or more of (i) being crystalline; (ii) being tough when formed into a film by compression moulding; (iii) being resistant to a wide range of solvents, in particular being, on immersion for 24 hours in methylene chloride (CH$_2$Cl$_2$) at 20° C., "essentially unaffected", that is, gaining not more than 10% by weight; and (iv) having a glass transition temperature over 200° C. and a melting temperature below 400° C., particularly below 390° C. and especially below 380° C.

5. A process for the preparation of a polymer by polycondensing, under substantially anhydrous conditions, at least one compound Y$^1$PhCOPhPhY$^2$ with at least one compound Y$^3$PhSO$_2$PhPhSO$_2$PhY$^4$ and at least one compound Y$^5$—Ar—Y$^6$ and/or with a polyarylethersulphone having repeating units —PhSO$_2$Ph Ph SO$_2$ Ph—and —Ar— in which polyarylethersulphone the repeating units are linked by ether linkages where
Ph is para-phenylene and
Y$^1$, Y$^2$ and, when present, Y$^3$ to Y$^6$ are independently halogen or —OH, and are such that halogen and —OH are in substantially equimolar amounts, in the presence of at least one alkali metal hydroxide, carbonate or bicarbonate in a stoichiometric amount of up to 25% excess with respect to the phenolic groups in the said compounds and the said repeat units of the polyarylethersulphone.

6. A process according to claim 5 in which alkali metal carbonate or bicarbonate is used and is introduced as particles smaller than 0.261 mm.

7. A process according to claim 5 in which at least one of Y$^1$ to Y$^6$ is bromine or chlorine and a copper containing catlyst is present.

8. A shaped article made of or containing with one or more additives a polymer according to claim 1 and having a percentage crystallinity greater than 15.

9. A process for making a shaped article which comprises shaping a polymer, optionally with one or more additives, according to any one of claims 1 to 4, and annealing the shaped article until its crystallinity exceeds 15%.

10. A process according to claim 9 in which the annealing step is at a temperature 60°–80° C. less than the temperature of the highest melting endotherm of the polymer.

* * * * *